W. B. TEMPLETON.
JACK.
APPLICATION FILED SEPT. 14, 1906.
916,502.
Patented Mar. 30, 1909.
5 SHEETS—SHEET 1.
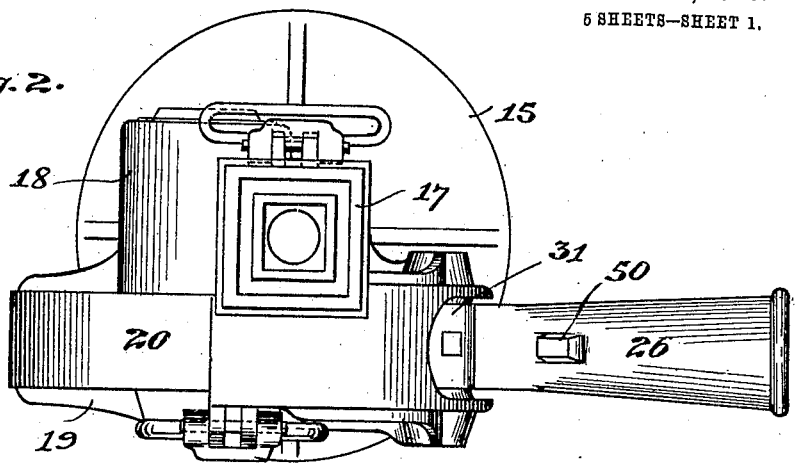
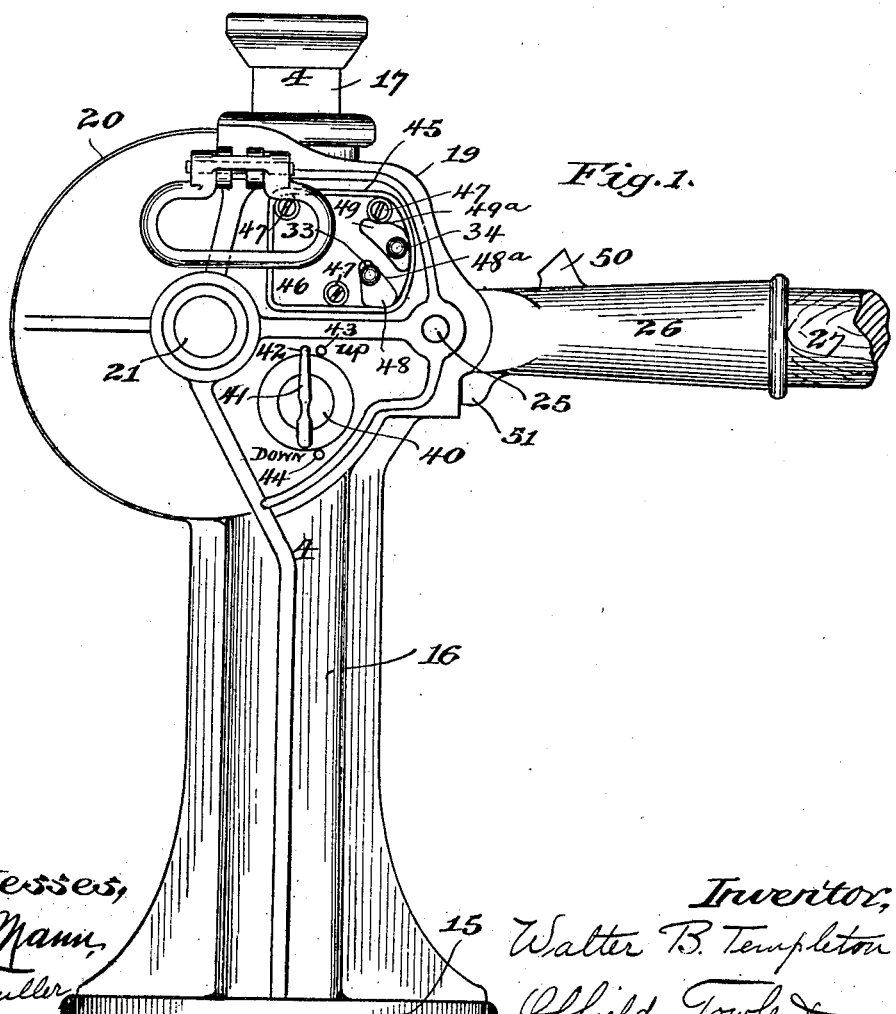
Witnesses,
Inventor,
Walter B. Templeton
Offield Towle &
Linthicum Atty's.

W. B. TEMPLETON.
JACK.
APPLICATION FILED SEPT. 14, 1906.
916,502.
Patented Mar. 30, 1909.
5 SHEETS—SHEET 2.
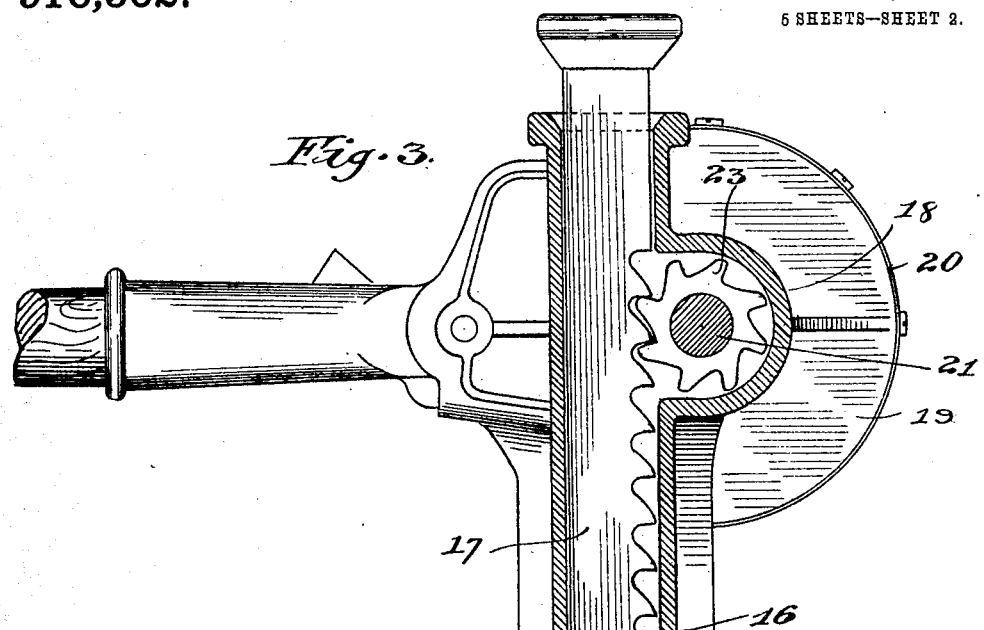
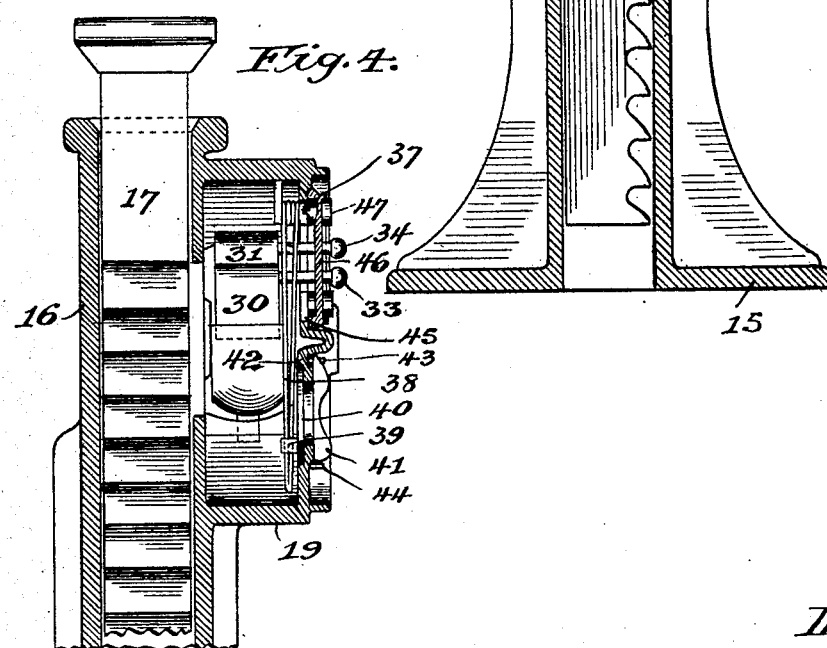
Witnesses:
Inventor;
Walter B. Templeton
By Offield Towle & Linthicum
Att'ys.

W. B. TEMPLETON.
JACK.
APPLICATION FILED SEPT. 14, 1908.
916,502.
Patented Mar. 30, 1909.
5 SHEETS—SHEET 3.
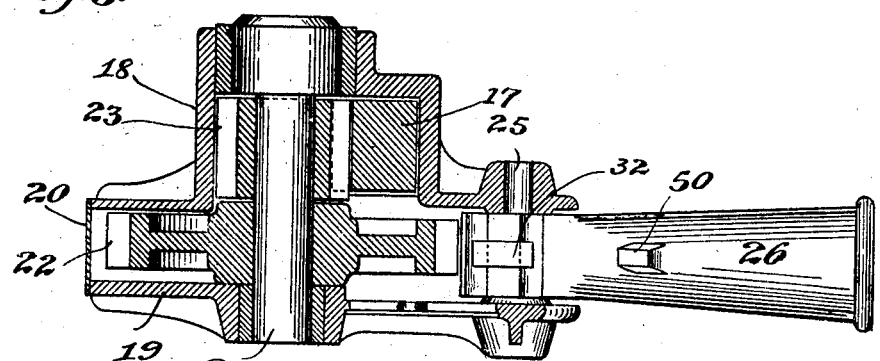
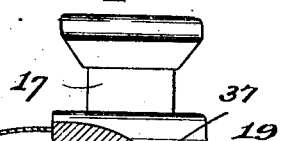
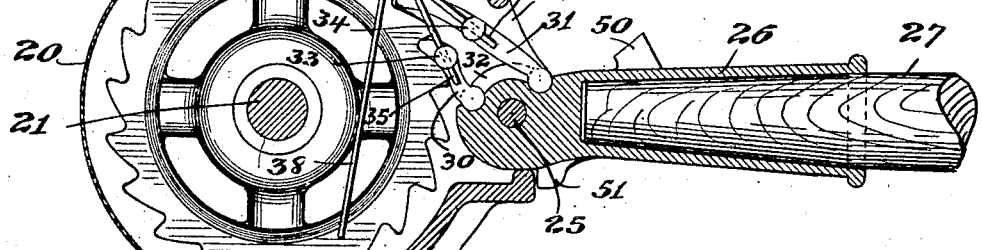
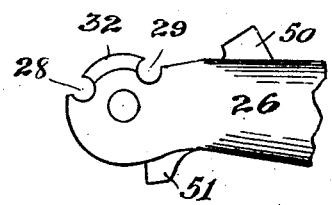
Witnesses,
S. Mann
W. M. Fuller
Inventor,
Walter B. Templeton
Offield Towle &
Linthicum Attys.

W. B. TEMPLETON.
JACK.
APPLICATION FILED SEPT. 14, 1906.
916,502.
Patented Mar. 30, 1909.
5 SHEETS—SHEET 4.
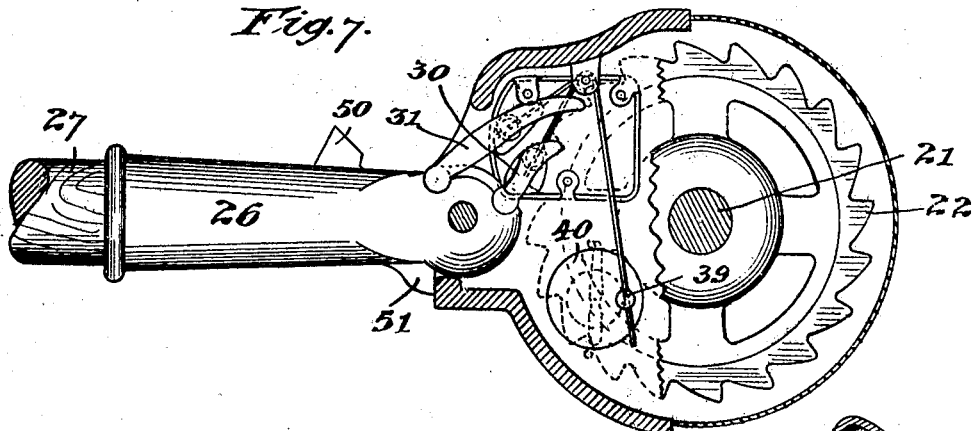
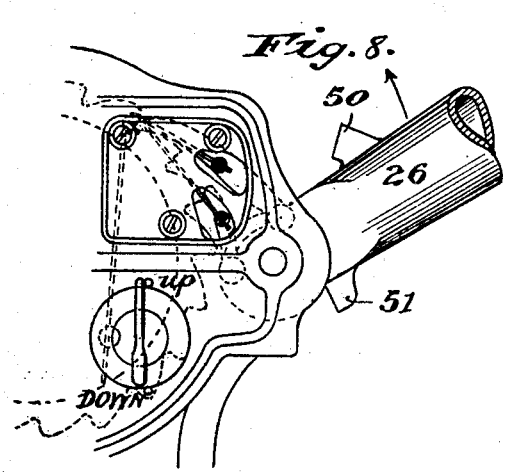 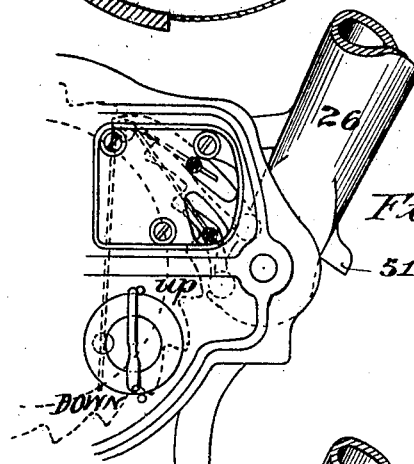
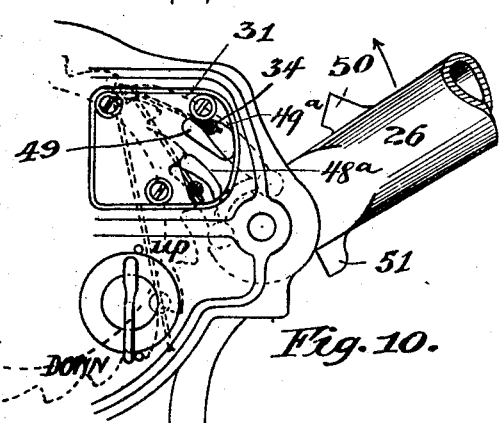 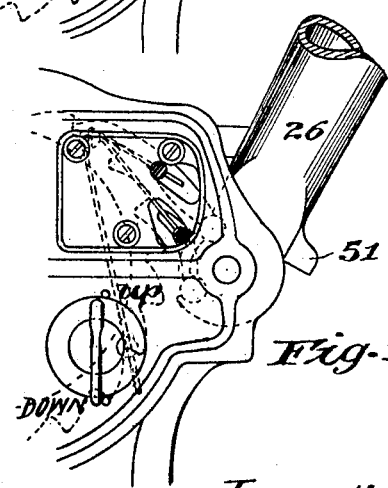
Witnesses,
F. S. Mann
Walter M. Fuller
Inventor,
Walter B. Templeton
By Offield, Towle & Linthicum
Attys.

W. B. TEMPLETON.
JACK.
APPLICATION FILED SEPT. 14, 1906.
916,502.
Patented Mar. 30, 1909.
5 SHEETS—SHEET 5.
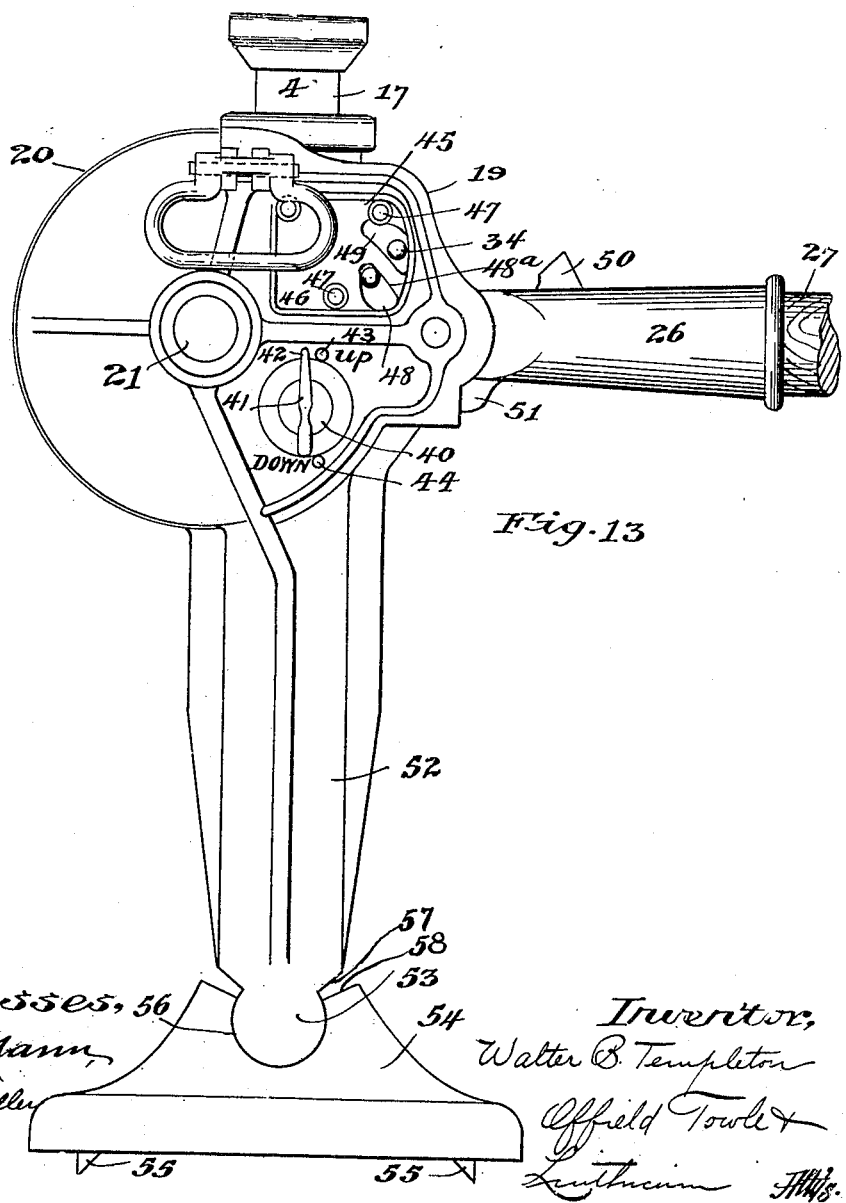

UNITED STATES PATENT OFFICE.

WALTER B. TEMPLETON, OF CHICAGO, ILLINOIS.

JACK.

No. 916,502.  Specification of Letters Patent.  Patented March 30, 1909.

Application filed September 14, 1906. Serial No. 334,688.

*To all whom it may concern:*

Be it known that I, WALTER B. TEMPLETON, a citizen of the United States, residing at Chicago, in the county of Cook and State of Illinois, have invented certain new and useful Improvements in Jacks, of which the following is a specification.

This invention relates to improvements in that class of lifting jacks designed for raising and lowering heavy bodies through the medium of a leverage mechanism; and more specifically it relates to that type of jack which is double acting; that is, in which a lifting or lowering movement is effected by both the upward and downward movements of the lever, accordingly as the pawls are set to effect a raising or lowering of the lifting bar on the operation of the lever arm or handle.

Among the salient objects of the invention are to provide an improved mechanism of that type of increased simplicity and reliability of action, and of great lifting power; more specifically, to provide a mechanism wherein the lifting effect of the pawls is multiplied by means of increased leverage between said pawls and the lifting bar itself; to provide an improved construction of jack capable of operating at various angles of inclination to its base and separable therefrom; to provide a construction which may be readily assembled and taken apart and which may also be inspected as to its main operating parts without disturbing the operating mechanism; to provide a jack wherein the convertible lifting and lowering functions of the pawls may be carried out either automatically or manually, and in general to provide improvements in the details of construction and arrangement of the mechanism.

To the above ends the invention consists in the matters hereinafter described, and more particularly pointed out in the appended claims, and the invention will be readily understood by reference to the accompanying drawings forming a part thereof, in which,—

Figure 1 is a side elevational view of the complete jack; Fig. 2 is a top plan view thereof; Fig. 3 is a vertical section in the plane of the lifting bar; Fig. 4 is a vertical section through the upper portion of the device in a plane at right angles to that of Fig. 3, substantially on the line 4—4 of Fig. 1; Fig. 5 is a cross-section substantially in the horizontal plane of the handle pivot, the pawls being removed; Fig. 6 is a vertical section through the casing of the ratchet disk; Fig. 7 is a vertical sectional view similar to Fig. 6, but taken from the opposite side of the device, and illustrating the controlling device of the pawl-actuating springs; Figs. 8 and 9 are fragmentary detail views illustrating the relative positions of the pawls at intermediate and highest positions of the handle during the lifting operation; Figs. 10 and 11 are similar views illustrating the relative positions of the pawls at corresponding positions of the lifting handle during the lowering operation; Fig. 12 is a fragmentary side elevational view of the inner end of the handle lever detached. Fig. 13 is a side elevation of a jack provided with a modified type of base; and Fig. 14 is a plan of the base shown in Fig. 13.

Referring to the drawings, 15 designates a base-plate from which rises a hollow upright 16 containing the usual lifting bar 17, and having formed on one side thereof a casing 18, and to one side of the latter a larger approximately circular casing 19, all of these parts being preferably formed integral or in a single casting. For convenience in assembling the parts the rear half of the edge wall of the casing 19 is conveniently formed by a sheet metal strip 20 secured in place by screws or bolts.

Journaled in suitable bearings in the outer side walls of the casings 18 and 19 and co-axially with the latter, is a shaft 21, fast on which within the casing 19 is a large ratchet disk 22, to one side of which fast on the shaft 21 and engaging the teeth of the lifting bar 17 is a smaller ratchet disk 23. In one side of the casing 19 is an opening 24, in which is mounted on a pivot-pin 25 the inner end of the metal socket member 26 of the usual lever arm or handle 27 of the jack. On opposite sides of the pivot 25 are formed in the upper edge of the socket-piece inner and outer seats 28 and 29 (Fig. 12) forming knuckle joints for a pair of pawls 30 and 31, respectively. A central rib 32 on the upper edge of the socket-piece between and at its ends overhanging the seats 28 and 29 serves to confine the pawls to their seats, permitting the pawls to be inserted edgewise, the pawls being socketed or apertured sufficiently opposite the ends of the rib 32 to accommodate the latter.

As will be seen by reference to Figs. 6 and 7, the pawls are so positioned as to normally tend by gravity to fall toward and into engagement with the periphery of the large ratchet wheel 22 which they are designed to engage. In order, however, to insure such engagement of the pawls with the ratchet disk during the lifting operation, as well as to render the same pawls capable of effecting the lowering of the lifting bar under a step by step movement, I employ a pair of controlling springs with means for so tensioning said springs as to cause them to urge the pawls toward or from the ratchet disk accordingly as the lifting bar is to be raised or lowered. To this end the pawls are provided with laterally projecting studs 33 and 34 which are apertured to receive the free ends 35 and 36 of a bent wire spring, which latter is pivoted on a pivot-bolt 37 secured to the casing 19 and has its looped or body portion 38 extended downwardly on the opposite side of the pivot and passed through a stud 39 (Fig. 7) rotatably and eccentrically mounted in a disk 40, which latter in turn is rotatably mounted in a circular opening in the outer side wall of the casing 19, as best shown in Fig. 1. The disk 40 is provided with a thumb-piece 41 for manipulating the same, one end of which is pointed, as indicated at 42, said pointed end being adapted to engage either of a pair of oppositely disposed stop-pins 43 and 44, the former indicating the "up" position, and the latter the "down" position of the pawls. From this it will be seen that when the disk 40 is turned so as to throw the member 38 of the spring inwardly to the position indicated in Fig. 6, the ends 35 and 36 of the spring which engage the pawls are likewise flexed inwardly and therefore tend to urge the pawls toward the ratchet disk 22. On the other hand, when the section 38 of the spring has been swung to the opposite side of the center of the disk 40 by turning the latter through a half revolution, the members 35 and 36 of the spring are flexed outwardly, and tend to throw the pawls outwardly or away from the ratchet disk 22.

When the spring has been set to the "up" position, as shown in Fig. 6, the mechanism as thus far described is complete for effecting the raising of the lifting bar. It will be seen that since the pawls 30 and 31 are both pivoted on the lever arm but on opposite sides of the pivotal axis thereof, the upward or downward swing of said lever arm tends to raise one of said pawls at the same time that it lowers the other for a fresh hold on the ratchet disk; the pawls engaging the teeth of the ratchet disk as soon as permitted by virtue both of gravity and the springs, and on their return movements sliding off the backs of the ratchet teeth.

The device is rendered capable of lowering the lifting bar by a step by step movement under the rising and falling movements of the lever arm by the following mechanism, aided by the pawl-actuating springs. 45 designates an opening in the side wall of the casing 19 closed by a plate 46 detachably secured thereto as by means of screws 47. In the plate 46 are formed a pair of openings 48 and 49 through which project the studs 33 and 34 in the sides of the pawls. The upper edges 48$^a$ and 49$^a$ of these openings are so formed as to engage the studs as the pawls are alternately raised and, by virtue of such engagement, direct the noses of the pawls into engagement with the teeth of the ratchet disk. By reference to Fig. 10, wherein the handle is shown as approximately half way up on its rising movement, it will be seen that the stud 34 is engaging the guiding surface 49$^a$ of the opening 49 and is thereby directing the nose of the longer pawl 31 into engagement with the ratchet disk. During this time the lifting bar is descending under a load, which is being sustained by the lower pawl 30 already in engagement with the ratchet disk. Just before the handle reaches the limit of its upward swing, which is shown in Fig. 11, the load will have been assumed by the upper pawl 31, so that at the upper limit of movement of the handle the lower pawl is freed from the load, and its spring 35 throws it outwardly. During the following downward movement of the handle the load is sustained by the upper pawl 31, and the lower pawl 30 is forced upward and into engagement with the ratchet disk by virtue of the engagement of its stud 33 with the guide-surface 48$^a$, said lower pawl taking the load just before the handle reaches the limit of its downward movement so that, at such limit, the upper pawl is free to swing outwardly under the influence of its spring 36, whereupon the described cycle of operation is repeated on the following up and down movements of the handle. The openings 48 and 49 are sufficiently wide not to interfere with the movements of the pawls during the lifting operation, during which latter the studs 33 and 34 play freely back and forth between the opposite ends of the openings without contacting the guide-surfaces 48$^a$ and 49$^a$, as shown in Figs. 8 and 9, since they are continuously impelled inwardly by their springs, and hug the backs of the teeth of the ratchet disk during their return movements. Stop lugs 50 and 51 on the upper and lower sides of the handle socket 26 in rear of the pivot of the latter are adapted to contact the casing above and below the pivot 25, respectively, to limit the extent of swing of the handle.

In Figs. 13 and 14 I have illustrated a modified form of separable base for the jack which permits its operation in a vertical position or at an inclination, the base being supplied with downwardly projecting teeth to press into the support on which the jack is placed and prevent slipping of the base. The hollow upright or column 52 has on its lower end a rib or bead 53 nearly cylindrical in cross-section, while the base 54 has sharp teeth 55 on its bottom surface and an undercut transverse recess 56 on its top surface adapted to receive the rib 53, which may turn therein to a limited extent determined by the meeting of shoulders 57 and 58 of the column or upright and the base, respectively. Separation of the two parts may be readily effected by sliding one laterally relative to the other. The base after its teeth have been embedded in any form of support, such for example as a railroad tie, provides a firm foundation for the jack proper which may be operated vertically or at an angle, the bead 53 and socket or recess 56 comprising a hinge permitting its turning.

From the foregoing it will be observed that my invention provides a jack having a pair of pawls operating upon a single ratchet and serving to operate the lifting bar alternately on both the upward and downward movements of the handle, and capable of being reversed to change from a raising to a lowering action, and vice versa, by simply reversing the direction of impulse of the pawl-controlling springs. It will also be observed that my invention provides an increased leverage between the actuating pawls and the lifting bar itself, which increase is proportional to the differences in radii of the two ratchet disks 22 and 23. This obviously produces a ratchet of enormous lifting power. The provision of a rotary member such as the ratchet disk 22 having a circular ratchet surface engaged by the pawls possesses a distinct advantage over a straight vertical ratchet surface where the pawls are pivoted on opposite sides of the pivotal center of the handle, since where the pawls engage a curved ratchet surface as in the present case the line of thrust of both pawls is substantially coincident with the line of bodily movement of the pawls themselves, or closely approaches such line of bodily movement; whereas, were such pawls to engage a straight vertical ratchet, the upper pawl would necessarily have to operate at considerable of an angle to its line of thrust, and at a consequent mechanical disadvantage. By reason of the fact that the studs 33 and 34 project outside the casing, the pawls can be operated manually independently of the springs, which is an advantage in case the springs should accidentally become broken or otherwise rendered inoperative.

Many variations and modifications in the nature of mechanical equivalents of the mechanisms shown and described will readily suggest themselves to those skilled in the art; and hence the invention is by no means limited to the particular mechanism disclosed, so long as the operative principle thereof is preserved.

I claim:

1. In a jack, the combination with a casing, and a lifting-bar slidably mounted therein, of an operating lever pivotally mounted in said casing, a pair of alternately acting pawls carried by said lever, a ratchet-member engaged by said pawls and operatively connected to said lifting-bar, a controlling spring for each of said pawls, and means for reversing the direction of impulse of said springs whereby the latter may be caused to urge the pawls toward or from said ratchet-member at will, substantially as described.

2. In a jack, the combination with a casing, and a lifting-bar slidably mounted therein, of an operating lever pivotally mounted in said casing, a pair of alternately acting pawls carried by said lever, a ratchet-member engaged by said pawls and operatively connected to said lifting-bar, springs engaging said pawls, and means for flexing said springs in opposite directions whereby to urge said pawls toward or from said ratchet-member as desired, substantially as described.

3. In a jack, the combination with a casing, and a lifting-bar slidably mounted therein, of an operating lever pivoted in said casing, a pair of alternately acting pawls carried by said lever, laterally projecting pins carried by said pawls, a ratchet-member engaged by both of said pawls and operatively connected to said lifting-bar, spring means for normally urging said pawls out of engagement with said ratchet-member during the descending movement of the lifting-bar, and cam guides engaged by said pins and alternately forcing said pawls in opposition to said spring means into dogging engagement with said ratchet-member during the movements of said operating lever, substantially as described.

4. In a jack, the combination with a slotted casing, and a lifting-bar slidably mounted therein, of an operating lever pivoted in said casing, a pair of alternately acting pawls carried by said lever, a ratchet-member engaged by said pawls and operatively connected to said lifting-bar, and pins connected to said pawls and projecting through the slots of said casing whereby said pawls may be manually manipulated to effect, in coöperation with said operating lever, either the raising or lowering of said lifting-bar, substantially as described.

5. In a jack, the combination with a casing, and a lifting-bar slidably mounted therein and having a ratchet face, of an operating lever pivoted in said casing, a pair of alternately acting pawls carried by said lever on opposite sides of its pivot, respectively, a shaft journaled in and transversely of said casing, a ratchet disk fast on said shaft engaged by said pawls, a smaller ratchet disk also fast on said shaft and engaged with the ratchet face of said lifting-bar, springs engaging said pawls, means to flex said springs so as to urge the pawls either toward or from said first-named ratchet disk, and cam means for forcing said pawls into dogging engagement with said first-named ratchet disk during the descending movement of said lifting-bar, substantially as described.

6. In a jack, the combination of a base equipped on its bottom surface with sharp teeth adapted to be embedded in the support beneath said base and provided on its top surface with a straight transverse undercut recess or socket opening at its ends through the opposite sides of the base, and a column supporting the lifting mechanism supplied with a rib insertible endwise into and seating in said recess or socket and forming therewith a hinge for said column, said base and column being further provided with coöperating inclined shoulders lying parallel with the margins of said recess and forming stops to limit the degree of inclination of the column, substantially as described.

WALTER B. TEMPLETON.

Witnesses:
FREDERICK C. GOODWIN,
WALTER M. FULLER.